C. WEILAND.
TIRE HOLDER.
APPLICATION FILED SEPT. 30, 1915.
1,233,628.
Patented July 17, 1917.
2 SHEETS—SHEET 1.
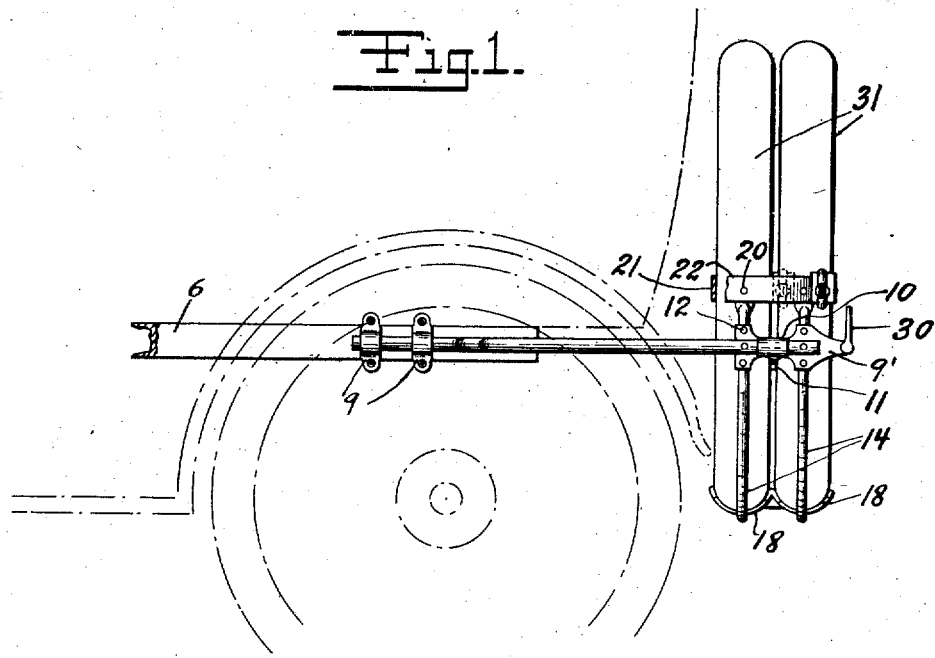
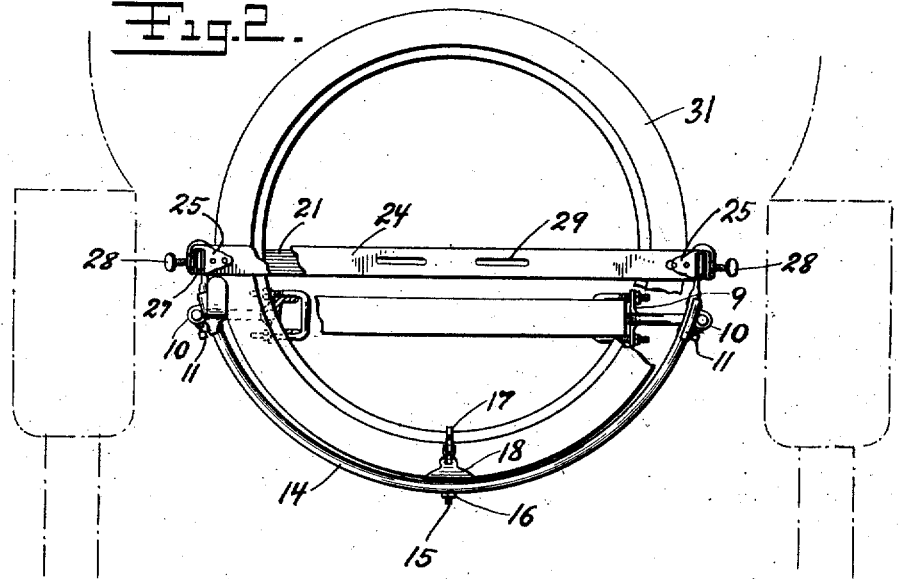

C. WEILAND.
TIRE HOLDER.
APPLICATION FILED SEPT. 30, 1915.
1,233,628.
Patented July 17, 1917.
2 SHEETS—SHEET 2.
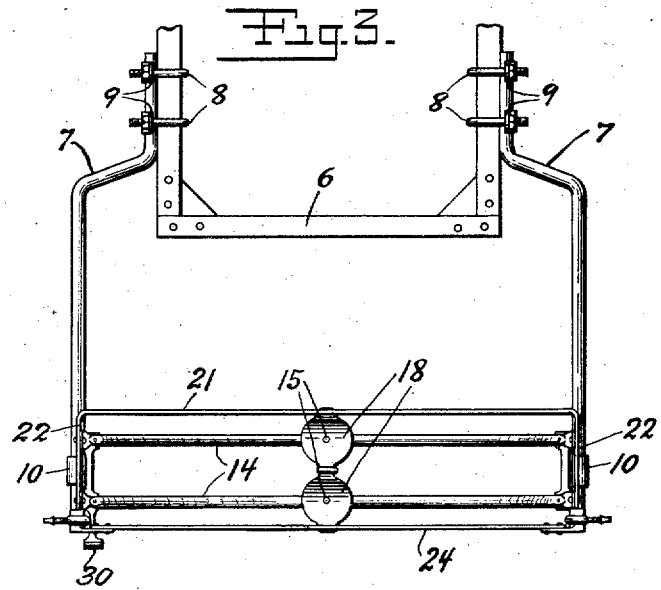
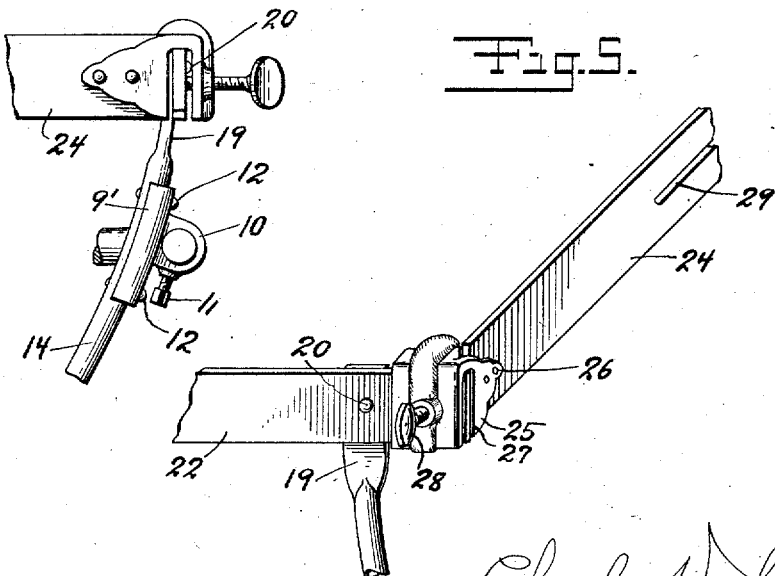
Witness
Chas Weiland
Charles Weiland
Inventor
By Frank J. Lent
his Attorney

UNITED STATES PATENT OFFICE.

CHARLES WEILAND, OF NEW YORK, N. Y.

TIRE-HOLDER.

1,233,628.   Specification of Letters Patent.   Patented July 17, 1917.

Application filed September 30, 1915. Serial No. 53,251.

*To all whom it may concern:*

Be it known that I, CHARLES WEILAND, a citizen of the United States, residing at New York, in the county of New York and State of New York, have invented certain new and useful Improvements in Tire-Holders, of which the following is a specification.

This invention relates to holders for spare tires for automobiles, such holder being particularly intended for use at the rear end of an automobile or the like.

One of the objects of the invention is to provide a device of the kind referred to which is very simple in its construction and economical to manufacture, being made up for the most part of standard shapes, requiring no special treatment and presenting no particular difficulties in assembly.

A further object of the invention is to provide a device of the character referred to in which provision is made for securely holding one or a plurality of spare tires, as may be desired.

Still another object of the invention is to provide a device for the purpose mentioned which is in the nature of an open framework or cage, and which is so arranged that the parts against which the surfaces of the tire rest are not apt to collect water; thus eliminating one of the principal sources of tire deterioration.

Another object is to provide a spare tire holder which is readily removable as a whole from the automobile or other vehicle, and which also combines in itself means for supporting a license and also for supporting a tail lamp.

Other objects and aims of the invention, more or less broad than those stated above, together with the advantages inherent, will be in part obvious and in part specifically referred to in the course of the following description of the elements, combinations, arrangements of parts, and applications of principles constituting the invention; and the scope of protection contemplated will appear from the claims.

In the accompanying drawings, which are to be taken as a part of this specification, and in which I have shown a merely preferred form of embodiment of the invention, Figure 1 is a side elevation with parts broken away and parts in section, showing the application of an embodiment of the invention to the rear of an automobile, the latter being indicated in broken lines; Fig. 2 is a view taken at right angles to Fig. 1 with parts broken away; Fig. 3 is a top plan view of the same; Fig. 4 is a detail of the connection between certain parts of the tire-supporting frame proper; and, Fig. 5 is a perspective view of the same.

Referring to the numerals on the drawings, there is indicated at 6 a part of the rear frame of an automobile. At each side of this frame there is a rod 7, secured to the frame as by means of U-bolts 8 and clamping plates 9. These rods are arranged in horizontal parallelism, and may be bent as necessary so that their free ends will be spaced apart as the exigencies of the case may require. These rods 7 carry the tire holder, and by virtue of the U-bolt connection with the automobile, it is evident that the entire arrangement may be quickly and easily removed as a whole.

At the free end of each of the rods 7 there is a casting 9′, including a sleeve portion 10 which slides over the end of the rod 7, the casting being fixed in desired position longitudinally of the rod by means of set screw 11. Each casting 9 has two wings, one on each side of its sleeve 10, and these wings of one casting are riveted as indicated at 12 adjacent an end respectively of a pair of rods 14, while the wings of the other casting 9 are respectively riveted in the same way adjacent the other ends of these rods 14. Rods 14 are semicircular (see Fig. 2), are arranged in parallel, and lie in vertical planes. At the end of a vertical diameter of the circle on which the respective rods 14 are curved, there is provided for each rod 14 a short half round trough 18, or the two troughs may be integral, and each trough is adapted to receive the tread periphery of a tire. Each trough is held in place on its rod 14 by means of a bolt 15 which extends through the trough and is threaded through the rod 14, being held in place by means of a nut 16. There may also be provided the usual strap arrangement 17 coöperating with the trough or troughs 18, to hold the tire securely in place, such strap or straps being secured to the end walls of the trough or troughs encircling the tire or tires.

Above the point on each rod 14 at which the wing of the casting 9 is secured, each end of each rod terminates in a flattened part 19, and to these flattened parts 19 of the ends of the rods 14 are riveted as indicated at 20, the ends of a bar 21, comprising a straight middle part and two side extensions 22. This bar 21 is supported so that it extends substantially in line with the horizontal diameter of the circle on which the rods 14 are curved, and it supports the tires held in the device against displacement rearwardly, that is to say, toward the back of the automobile, and aids the rods 14 and castings 9 to prevent lateral displacement of the tires. Each end portion 22 of the bar 21 extends appreciably beyond the point where it is riveted to the outside one of the rods 14, and there is provided another bar 24 which is intended to lie parallel with the bar 21, and which has at each end a fitting 25 riveted thereto as indicated at 26. Each fitting 25 has a vertical slot 27, whereby the fitting 25 may be placed in position over the end portion of the bar 22 at either side of the rivet 20 (see Fig. 5), and the fitting is held in place when adjusted, by means of a set screw 28 whose end engages with the end portion 22 of the bar 21. Thus, if only one tire is to be supported in the holder, it would preferably be placed in the inside one of the troughs 18, and the bar 24 would be positioned with its end fittings 25 engaging over the end portions 22 of the bar 21 at the left of the rivet 20, referring now to Fig. 5. If there were two tires 31 to be supported however, the bar 24 would be positioned as indicated in Fig. 5. The bar 24 constitutes the closure for the outer end of the holder, and prevents movement of the tires toward the rear. The bar 24 is preferably provided, as shown in Fig. 2, with slots 29, through which bolts may be passed for securing in position a license plate, and preferably also the casting at the left of the holder, referring to Fig. 2, is provided with a finger 30, from which a tail lamp may be supported.

It is thought that the manner of using the device herein described will be obvious, but it may be well to point out that inasmuch as it is in effect an open work frame, in which the tire is supported against surfaces which cannot collect or retain moisture, rotting of the tire, due to rain water or the like, is eliminated. Furthermore, the device is readily adjustable for one or a plurality of tires without any change except the loosening of the set screws 28 and the placing of the bar 24 in a new position. The device as a whole is very light on account of its open work construction and at the same time affords considerable protection against unauthorized or accidental removal of the contained tires. It is to be understood that the holder may have a capacity for more than two tires if desired, also that the particular means for holding the tires within the troughs 18 may be varied. For instance, the straps or chains 17 may have their ends secured together around the tire by means of padlocks or the like. Furthermore, it might be advantageous to locate the troughs 18 to one side or the other of the vertical diameter, so that they would the more readily discharge any water which might find its way into them.

Inasmuch as many changes could be made in the above construction, and many apparently widely different embodiments of my invention could be made without departing from the scope thereof, it is intended that all matter contained in the above description or shown in the accompanying drawings shall be interpreted as illustrative and not in a limiting sense.

It is also to be understood that the language used in the following claims is intended to cover all the generic and specific features of the invention herein described and all statements of the scope of the invention which, as a matter of language, might be said to fall therebetween.

I claim:

1. In a device of the kind described, a pair of main supporting rods and an open work tire supporting frame detachably connected to said rods, said open work frame including a curved rod, a trough-shaped member carried by said curved rod, a front bar, and a back bar, said front bar being provided with slots.

2. In a device of the kind described, a pair of main supporting rods and an open work tire supporting frame detachably connected to said rods, said open work frame including a curved rod, a trough-shaped member carried by the curved rod, and a lamp-supporting bracket carried by the rod.

3. In a device of the kind described, a pair of main supporting rods, a member detachably secured to each rod, a pair of parallel curved rods secured to said members, a trough-shaped member carried by each of the parallel curved rods, a U-shaped bar connected to the ends of said curved rods, and a bar adapted to be adjustably secured on the arms of said U-shaped bar.

In testimony whereof I affix my signature.

CHARLES WEILAND.

Copies of this patent may be obtained for five cents each, by addressing the "Commissioner of Patents, Washington, D. C."